United States Patent [19]
Lattarulo et al.

[11] 3,821,012
[45] June 28, 1974

[54] MICROPOROUS WATER-VAPOR PERMEABLE SHEET MATERIAL CARRYING CLOSELY SPACED RAISED POLYMER DEPOSITS

[75] Inventors: Charles Joseph Lattarulo, Wayne, N.J.; Frank Peter Civardi, White Plains, N.Y.

[73] Assignee: Inmont Corporation, New York, N.Y.

[22] Filed: Sept. 3, 1971

[21] Appl. No.: 176,393

Related U.S. Application Data

[63] Continuation of Ser. No. 833,518, June 16, 1969, abandoned.

[52] U.S. Cl. ........ 117/45, 117/135 S, 117/138.8 D, 117/161 KP
[51] Int. Cl. .............................................. B44d 1/16
[58] Field of Search .............. 117/8, 11, 38, 41, 45, 117/135.5, 138.8 D, 161 KP; 161/159, 413

[56] References Cited
UNITED STATES PATENTS

| | | | |
|---|---|---|---|
| 3,214,286 | 10/1965 | Rainberger | 117/41 |
| 3,382,089 | 5/1968 | Klein et al. | 117/41 |
| 3,450,044 | 6/1969 | Dixon | 101/170 |
| 3,481,765 | 12/1969 | Nakajo et al. | 117/63 |
| 3,481,766 | 12/1969 | Craven et al. | 117/76 |

*Primary Examiner*—William D. Martin
*Assistant Examiner*—M. R. Lusignan

[57] ABSTRACT

Flexible water vapor permeable sheet material having a microporous surface of elastomeric polyurethane by applying a discontinuous or open low relief pattern of small closely spaced raised deposits having heights in the range of about 0.1 to 1 mil covering about 30 to 70 percent of the total projected area of the surface. The product is a leather substitute highly resistant to abrasion and scuffing and having high moisture vapor permeability. Preferably a grain pattern in higher relief is applied over the low relief pattern.

10 Claims, 5 Drawing Figures

100 Mils

10 Mils

250 Mils

250 Mils

250 Microns

MICROPOROUS WATER-VAPOR PERMEABLE SHEET MATERIAL CARRYING CLOSELY SPACED RAISED POLYMER DEPOSITS

This is a continuation, of application Ser. No. 833,518, filed June 16, 1969, now abandoned.

In accordance with one aspect of this invention there is applied, to substantially the whole surface of a microporous, moisture vapor-permeable elastomeric polyurethane sheet material, a discontinuous or open pattern of elastomeric polyurethane in relatively low relief and then a second discontinuous or open pattern of elastomeric polyurethane in higher relief. The process of this invention makes it possible to produce a microporous leather substitute having a desirable grain pattern which is highly resistant to abrasion and scuffing and which has excellent moisture vapor permeability making it very suitable for uppers for men's shoes, for example.

In a preferred aspect of this invention the microporous sheet material is one which does not have its extensibility constrained by the presence of a reinforcing fabric such as a woven or non-woven fibrous fabric. Throughout its thickness it consists essentially of nonfibrous elastomeric polyurethane material. Unlike the conventional leather substitutes which have ultimate elongations of some 20-40 percent, it can be stretched well over 50 percent (e.g., well over 100 percent and usually well over 200 percent). Preferably the sheet, suitable for making shoe uppers, has a thickness of at least 25 mils (0.63 mm), e.g., about 30 to 100 mils (about 0.75 to 2.5 mm) and preferably about 30 to 70 mils (about 0.75 to 1.8 mm), e.g., about 0.8 to 1.1 mm for women's shoe uppers and about 1.5 to 1.8 mm for men's shoe uppers.

The microporous materials used in the process of this invention have pores invisible to the naked eye of a person with 20/20 vision. Such pores measure less than 100 microns in their maximum dimension (when a plane surface, such as the top or bottom of the material or a cross-section thereof is observed). As will be seen hereafter, the pores generally measure well below 50 microns in their maximum dimension.

One embodiment of the invention is illustrated in the accompanying drawings in which.

Figure 1:
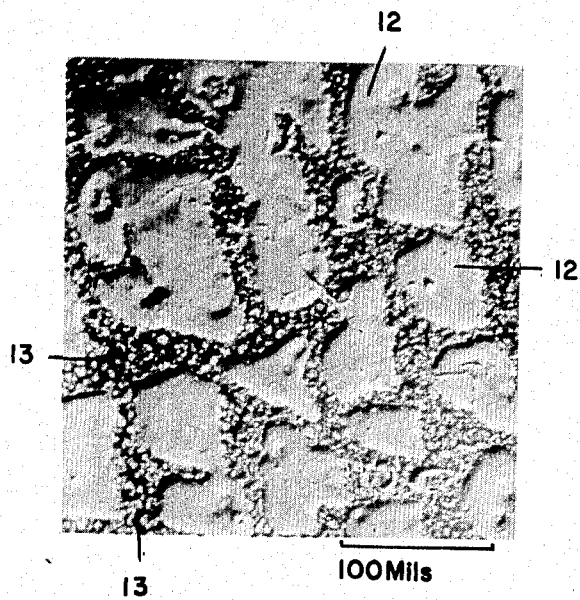
FIG. 1 is an enlarged photomicrograph looking down at the upper surface of a sheet made according to this invention.
Figure 2:
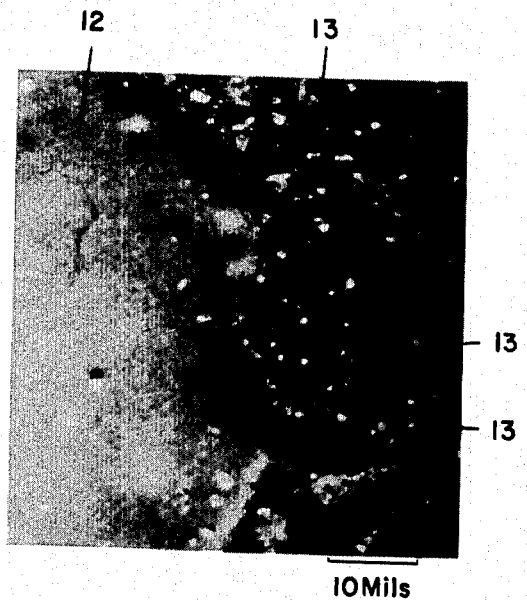
FIG. 2 is a view like FIG. 1 but at a higher magnification.

As indicated in FIGS. 1 and 2 the upper surface of the sheet carries spaced masses 12 of elastomeric polyurethane and also carries a discontinuous pattern of thin irregular-shaped lines, or low ridges, 13 of thermoplastic elastomeric polyurethane, in the spaces between the masses 12. In the illustrated embodiment these ridges, as such, form a continuous network and the ridges cover about 60 percent of the total projected surface area of the spaces between the masses 12; the spaces between ridges in turn represent, correspondingly, about 40 percent of that total projected surface area. The widths of the illustrated ridges 13 are on the order of about 0.25 to 1.0 mils (0.006 to 0.025 mm) and their heights are less than 1 mil and over 1/10 mil, being on the order of about ¼ to ½ mil (0.003 to 0.012 mm). It will be seen that no point in the pattern is more than about 2 mils from a ridge (or mass). In the preferred embodiment the heights of the masses 12 are at least 50 percent greater than the heights of ridges (e.g. 2,3,5 or 6 times the heights of the ridges).

The upper surface of the sheet, and the ridges 13 and the masses 12 may be of the same color or contrasting colors. Thus a sheet which has been dyed brown may carry black ridges and brown masses, giving a two-tone, or "aniline" effect. An undyed sheet (of white appearance) may be similarly treated or it may have a pattern of white ridges and blue masses, or orange ridges and green or blue masses, etc., etc.

The overall appearance is somewhat similar when the product does not contain the low relief pattern in the areas between the masses 12, but the abrasion resistance of the product is considerably lower.

Figure 3:
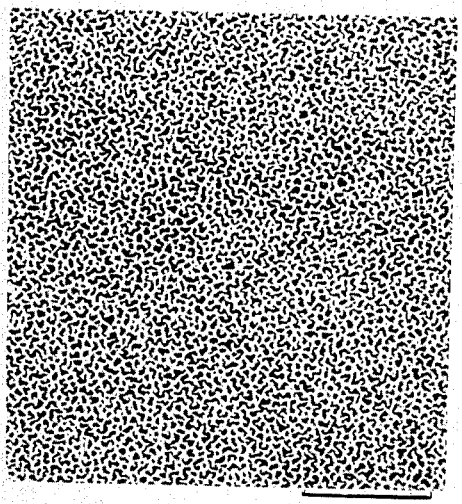
FIG. 3 is an enlarged photomicrograph looking down at an engraved "mezzo screen" printing plate used for applying the low relief pattern.

The illustrated product is produced by a method in which the ridges 13 are deposited on the upper surface of the sheet 11 in an overall pattern (a so-called Mezzo Screen pattern, as shown in FIG. 3) and the masses 12 are then deposited thereover in the indicated pattern, so that the pattern of ridges is now visible only in the areas between the masses, the other ridges having been merged into the masses 12 covering them.

Figure 4:
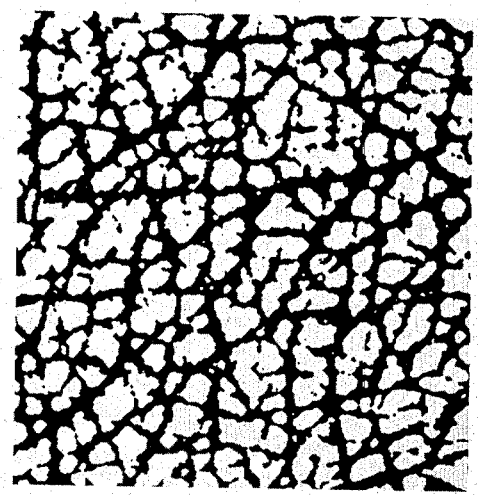
FIG. 4 is an enlarged photomicrograph looking down at an intaglio printing plate used for applying the high relief pattern.

The ridges 13 and masses 12 may be formed on the sheet by intaglio printing operations, using a relatively viscous solution of a thermoplastic elastomeric polyurethane in a volatile solvent, which solvent may also be a solvent for the polyurethane material of the base sheet, aiding in the bonding together of the deposited ridges, masses and base surface. Preferably this viscous solution is pigmented. It may be placed on the intaglio printing plate (FIGS. 3 and 4) and doctored (as with a steel doctor blade) into the engraved areas of the plate so that it fills the engraved areas and is removed from the unengraved portions. The upper surface of the sheet is then brought into contact with the printing plate and pressed against it with sufficient pressure to transfer the solution from the engraved portions to the sheet; such pressure may be applied in conventional manner, as by means of a rubber surfaced roll pressing against the back of the sheet. The printed sheet may be then treated to remove the solvent, as by passing it through a hot air oven.

One suitable solution for use in the intaglio printing has the following composition: 20 parts of thermoplastic elastomeric polyurethane (e.g., Estane 5707 which is substantially the same as the Estare 5740X7 described by Stetz and Smith in Rubber Age, May, 1967, Pages 74 –79) 2 parts of pigment (e.g., Excelsior Carbon Black of Columbia Carbon) and 78 parts of dimethylformamide (i.e. N,N-dimethylformamide). Because the solvent is removed after deposition of the solution, one deposits the solution as a ridge or mass of greater thickness than that of the final dried ridge or mass. Correspondingly the depths of the engraved portions of the printing plate are greater than the heights of the ridges and masses. Thus, for the particular solution described above, intaglio printing plates having engraved portions whose depths are about 1-½ mils (about 0.04 mm) and about 5 mils (about 0.13 mm) yield dried ridges and masses whose heights are about 0.4 mils (about 0.01 mm) and about 1-½ – 2 mils (about 0.04 – 0.05 mm), respectively.

These heights will also depend in part on the character of the surface being treated. For instance, for a low density, highly soluble, highly porous surface a more viscous polymer solution having a lower solvent activity with respect to the surface may be needed to accomplish the same results.

Pigments of various types may be present in admixture the solution being printed. These may be, such materials as carbon blacks (e.g., Excelsior or Raven II carbon blacks of Columbia Carbon), Phthalocyanine Blue BT 284 D, Phthalocyanine Green GT 6, 4 D, Monastral Red RT 790 D, Chloride White R900, Monastral Scarlet RT 7870, or Vat Yellow 212896 or mixtures of pigments.

As indicated previously, it is preferred to start with a microporous polyurethane sheet having a colored upper surface. The color may be imparted to the sheet material by including a small amount of a pigment (e.g., 1 to 5 percent of carbon black or other black, brown, or other colored pigment material) in intimate admixture with the polyurethane (or polyurethane precursor, when employed) prior to the formation of the sheet therefrom. Alternatively, the color may be imparted to the sheet by a due which may be applied subsequent to the making of the sheet. One suitable process for dyeing is by applying a solution of the dye in a volatile organic solvent; dyes such as those known as Irgacet dyes made in accordance with U.S. Pat. No. 2,551,056 (e.g., premetallized monoazo dyes, such as Irgacet Black RL or Irgacet Brown 2GL) dissolved in methanol may be used. The dye may be applied to a pigmented or unpigmented sheet. The dye or pigment may be present only in the upper surface zone of the sheet material, or may be present in higher concentration in said surface zone than in the rest of the sheet, or may be present more or less uniformly throughout the sheet. The upper surface of the dyed or pigmented sheet preferably has a relatively uniform overall appearance, with some streakiness owing, for instance, to difficulties in obtaining absolutely uniform dyeing or in obtaining an absolutely uniform surface the sheet material.

It is preferred that the low relief material (e.g., the ridges 13) occupy about 30 to 60 percent of the projected area of the spaces between the high relief masses, that the height of the low relief material be in the range of about ¼ to 1 mil, while the high relief masses occupy about 20 to 70 percent of the total projected area of the surface of the sheet and their heights are in the range of about ½ to 1-½ mils. The moisture vapor permeability (MVT) of the product is preferably at least about 1g/30cm 2/24 hrs. (measured at 70°F and 50 percent R. H.) and at least about one-half of that of the base sheet; for one typical sheet the MVT of the base sheet was originally 2g/30cm 2/24 hrs. and its MVT after printing in accordance with this invention was 1.6g/30cm²/24 hrs. The material retains the good flex life of the original base sheet (i.e., it has good resistance to the formation of outfold cracks during cold flex testing according to ASTM D 2097-62T on a Newark Leather Finish Co. flex testing machine operated in an atmosphere at a temperature of 0°C).

Excellent results have been obtained by using elastomeric polyurethanes as the material for both the high relief and low relief patterns. It is within the broader scope of this invention however to use other materials for one or both of these patterns. Examples of such other materials are vinyl or acrylic resins, such as plasticized polyvinyl chloride, polyvinyl butyral, polymers and copolymers of alkyl acrylates, epoxy resins etc.

It is within the broader scope of the invention to make a material of little grain, or more uniform (and less marked) grain by depositing only the discontinuous or open pattern in low relief. This can be done with a single low-relief printing as described or with two or more such printings so as to deposit successive low-relief patterns out of registry with each other, so that the low relief patterns cover, say, about 30 to 70 percent of the projected area of the sheet. While the resulting sheet does not have the pronounced grain it does have good abrasion resistance, moisture vapor permeability and flex life.

Figure 5:
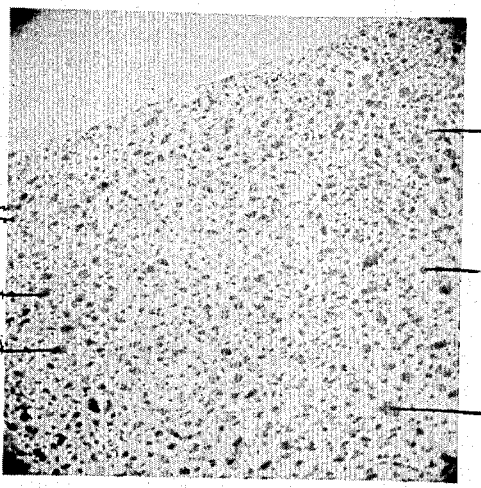
FIG. 5 is a photomicrograph of a cross-section taken through the upper portion of a microporous sheet material before treatment according to this invention.

The photomicrograph of FIG. 5 was obtained with a scanning type electron microscope (Type JSM, Japan Electron Optics Laboratory Co., Ltd.), viewing a cross-section of the sheet material (obtained by cutting perpendicularly through the thickness of the sheet with a razor). In preparation for viewing, the cut sheet material is given a very thin uniform metallic (gold-palladium) coating about 300 Angstroms in thickness; the coating may be applied by evaporating the metal onto the specimen in a high vacuum (e.g., $10^{-4}$ mm Hg absolute), the specimen being rocked while metal deposition is occurring, so as to distribute the metal uniformly over the surface, including the crevices, of the specimen. This coating serves to conduct away the electron charge which would otherwise accumulate on the surface of the specimen when it is exposed to the electron beam in the scanning electron microscope. The approximate scale is indicated on the photomicrograph. In viewing the photomicrographs it should be borne in mind that the scanning type electron microscope has a great depth of focus (nearly 300 times that of the light microscope) such as about 300 microns at 100X magnification or 100 microns at 1,000X magnification, enabling one to, in effect, see into the interiors of the pores.

The invention is of particular utility in the treatment of a microporous sheet having a structure as illustrated in FIG. 5 in which the pore system comprises cavities 32 having their maximum dimensions in the range of up to about 45 microns, connected by passages 33 which may have much smaller dimensions (e.g., maximum dimensions apparently as low as about ½ micron). The walls of the cavities may be very thin, such as the wall seen between the two cavities at the upper left hand side of FIG. 5, which appears to have a thickness which is within the range of about 1 to 10 microns; it will be understood that other walls are seen braodside, or at an angle, so that their thinness is not readily apparent. Fine cavities 34 may also be present in the walls of the irregular cavities 32. One suitable method for making such a structure is by forming, as on a temporary support, a thick layer of a mixture of a leachable material (such as microscopic sodium chloride particles) and a solution of the thermoplastic polyurethane in a solvent (e.g., dimethyl formamide) and treating the layer on the support with a liquid coagulant-leaching agent (e.g., water) which is a non-solvent for the polyurethane and at least partially miscible with the solvent, so as to coagulate the polyurethane into a microporous sheet; the treatment with the coagulant is continued until substantially all the solvent and leachable material are removed; the resulting water vapor-permeable flexible sheet material is dried and stripped from the temporary support.

Another type of microporous sheet which may be treated in accordance with this invention has a structure in which the pore system is substantially free of the larger cavities 32 seen in FIG. 5, but instead includes a multitude of fine interconnected pores of considerably smaller size. One technique for making such a product uses a mixture comprising the thermoplastic elastomeric polyurethane uniformly distributed in a blend of a volatile solvent and a miscible less volatile nonsolvent. In a preferred version of this technique a clear hot solution of the polyurethane in the solvent-nonsolvent blend is cooled until a cloudy colloidal dispersion of the polyurethane is formed; this cloudy dispersion is cast as a thick layer onto the temporary support and the solvent and nonsolvent are evaporated, and the sheet is removed from the support.

Microporous sheets which may be treated in accordance with the present invention may be made by other techniques. Thus, other coagulating methods may be used to treat the thick layer of the mixture of polyurethane solution and leachable material. Among such coagulating methods are cooling the mixture, (e.g., $-78°C$), or subjecting the mixture to vapors of nonsolvent (e.g., to a humid atmosphere), or simply evaporating the solvent, preferably at a rate slow enough to avoid the formation of macroporous bubbles or holes in the sheet, or using various combinations of these coagulating methods (e.g., freeze drying techniques) before removal of the leachable material (e.g., NaCl) or other microscopic particulate material. In place of, or together with, the salt particles, other pore-forming microscopic particulate material may be used. These particulate materials may be starch particles (which may be removed by treating the coagulated layer with an aqueous starch-digesting agent, such as an enzyme, of known type). Or they may be other microscopic solid particles which are insoluble in the polyurethane solution and which can either be dissolved out by treating the coagulated sheet with water or other suitable solvent for the particle which is a non-solvent for the polyurethane or can be otherwise destroyed or removed; examples of such particles are sodium carbonate, oxalic acid, ammonium carbonate, or suitable microballoons. Alternatively, the void-forming particulate material may be in the form of dispersed microscopic droplets of a liquid insoluble in the solution of polyurethane or in the form of dispersed microscopic bubbles of gas. The particle size of the microscopic particulate material is well below 100 microns, preferably less than 50 microns and greater than about one micron, more preferably in the range of about 3 to 20 microns. The ratio of the total volume of the microscopic particulate void forming material and the total volume of polyurethane in solution may be for instance, in the range of about 0.5:1 to 5:1, preferably in the range of about 1:1 to 3:1, thus 178 grams of the sodium chloride particles may be mixed with 333 grams of a 30 percent solution of the polyurethane in dimethylformamide, giving a volumetric salt:polymer ratio of 1:1.

It is also within the broad scope of this invention to employ microporous materials made by a process in which fine particles of the polyurethane, with or without a particulate void-forming material (such as any of the microscopic particulate materials previously mentioned), are fused together at their points of contact as by means of heat alone or heat in the presence of a solvent or swelling agent for the polymer which solvent or swelling agent may be distributed over the surfaces of the polymer particles, followed, when desired, by removal of any of the void forming particulate that may be present.

The solid polymeric material of the microporous sheets treated in accordance with this invention is a thermoplastic elastomeric polyurethane material having an intrinsic viscosity of above 0.6, preferably above 0.8, and more preferably about 1 or more. The polyurethane is composed of segments having urethane linkages and intermediate longer segments which may for example be of polyester or polyether character. The urethane linkages are preferably derived from aromatic diisocyanates, such as diphenyl methane -p, p'-diisocyanate, and are thought to provide so-called "hard" segments in the polymer molecule, while the other segments (e.g., the polyester or polyether segments) are flexible or "soft." Polyurethanes of this type are known in the art. They may be made, for instance, by reacting a relatively low molecular weight hydroxyl-terminated polyester or polyether (e.g., of molecular weight below 6,000, and preferably between 800 and 2,500) with a low molecular weight glycol and a diisocyanate.

In making the polyurethane one may employ a polyester of a hydroxycarboxylic acid (e.g., a polycaprolactone) or a polyester of a glycol and a dicarboxylic acid (e.g., ethylene glycol adipate or 1,4-butanediol adipate) or a mixed polyester of these types of components. Examples of other dicarboxylic acids which may be used instead of, or in addition to, adipic acid, are succinic, pimelic, suberic, azelaic or sebacic acids or aromatic acids such as phthalic acid or terephthalic acid. Examples of other glycols which may be used to make the polyester are 1,6-hexanediol and 1,8-octanediol. The most useful polyesters are aliphatic polyesters in which the

groups are separated by aliphatic chains averaging about 3 to 6 carbon atoms in length.

Typical polyethers which are used to provide the soft segments for elastomeric polyurethanes are usually of aliphatic character. One type has the formula H (RO)$_n$H where R is a divalent alkylene radical, such as tetramethylene or ethylene or propylene, and "n" denotes the degree of polymerization.

The preferred diisocyanate is diphenyl methane -p, p'-diisocyanate, but other diisocyanates may be used as such or in admixture therewith. Examples of other diisocyanates are 2,4-toluene diisocyanate, p,p'-diphenyl diisocyanate and tetramethylene diisocyanate.

The low molecular weight glycol referred to above acts as a chain extender. The preferred chain extender is tetramethylene glycol, but other chain extenders may be used as such or in admixture therewith. Examples of such other difunctional chain extenders are other dihydric alcohols such as ethylene glycol, hydroxy amines such as 2-aminoethanol, diamines such as ethylene diamine, or water. The amount of chain extender is preferably such as to produce a thermoplastic product of high intrinsic viscosity.

In the preferred class of polyester polyurethanes made with diphenylmethane-p,p'-diisocyanate, those having nitrogen contents in the range of 4 to 5 percent, most preferably in the neighborhood of 4½percent (e.g., 4.4–4.6 percent) have been found to be particularly suitable.

Preferably, the polyurethane material should have a melting point of at least 100°C preferably above 150°C (e.g., about 170 to 200°C (as measured by differential thermal analysis or differential scanning calorimetry). When formed into a smooth void-free thin film 0.2–0.4 mm in thickness it should preferably have the properties described below; such thin films can be formed by careful casting of solutions of the polymer (e.g., a degassed 30 percent solution in dimethylformamide) followed by careful evaporation of the solvent in a dry atmosphere: a tensile strength of at least 210 kilograms per square centimeter (preferably at least 350, e.g., about 420 to 560), a percent elongation at break of at least 300 percent (preferably at least 400 percent, e.g., about 500 to 700 percent), an elastic modulus of at least 105 kilograms per square centimeter (preferably at least 350 e.g., about 560 to 770), a 100 percent secant modulus (stress divided by strain at 100 percent elongation) of at least 28 kilograms per square centimeter (preferably at least 84, e.g. about 110 to 134). These mechanical properties are measured by ASTM D882-67.

The polyurethane (again, tested as a thin film made as described above) should preferably recover completely from a 5 percent elongation at room temperature (23°C) but preferably does take on a permanent set (one measured for example as in an ASTM D412-66) after a 100 percent elongation. This set is usually within the range of about 5 to 20 percent; for the best materials thus far employed it is in the range of about 10 to 20 percent, e.g. about 15 percent. A typical material shows a tension set of some 24–26 percent immediately on release of the clamps after being held at the 100 percent elongation for 10 minutes while the "permanent set", which is here taken as the tension set measured 1 hour after the release of the clamps, is 14 percent (measured on a film specimen 1 cm wide with a gage length of 5 cm and a strain rate, for the 100 percent elongation, of 254 percent per minute). Preferably the material has a Shore hardness of at least 75A (more preferably about 90A to 60D), measured by ASTM D1706-67.

The polyurethane material may be composed of polyurethane per se. It is also within the broad scope of the invention to use polyurethane materials which are blends of polyurethanes and other high polymers such as a vinyl chloride polymer (e.g., the vinyl chloride copolymers known as Bakelite VYHH or VAGH, containing vinyl acetate as a comonomer) or a rubbery copolymer of a conjugated diolefin and acrylonitrile (e.g., the butadiene-acrylonitrile copolymer known as Hycar 1031). The amount of such other high polymer is generally below 40 percent (e.g., 10 percent or 20 percent) of the total weight of the blend.

Both before and after the treatment of this invention the unreinforced microporous sheet material preferably has a percent elongation at break of above 50 percent (e.g., above 100 percent, such as in the range of about 300 to 400 percent or more); a tensile strength above 35 kg/cm$^2$ (e.g., in the range of about 4 to 9), and a slit tear strength (ASTM D2212-64) above 1 Kg per mm thickness (e.g.) in the range of about 2 to 5.

Especially suitable microporous sheets have a density above 0.3 g/cm$^3$ (preferably in the range of about 0.35 to 0.65 g/cm$^3$, more preferably at least about 0.4 g/cm$^3$ e.g., 0.4 to 0.5 g/cm$^3$, and are substantially free of macropores. In one form of the invention the microporous material being treated comprises a more dense base layer (e.g., of apparent density about 0.4 to 0.5 g/cm$^3$, and about 0.6 to 1.6 mm thick) and a less dense upper layer (e.g., of apparent density about 0.3 to 0.4 g/cm$^3$ and about 0.1 or 0.2 to 0.5 mm thick).

As indicated, the invention has its greatest utility in the treatment of unreinforced microporous polyurethane elastomer sheet material. In its broader aspects, however, the invention may be applied to microporous sheets which comprise a woven or non-woven fabric backing coated with, and usually impregnated with, microporous polyurethane elastomer material. In this case the microporous layer overlying the impregnated fabric layer is usually relatively thin, (e.g., below 25 mils (0.63 mm) e.g., 0.2 to 0.4 mm) although the total thickness of the sheet material (including the fabric body layer or reinforcement) is about the same as that of applicant's preferred unreinforced polyurethane sheet material. In one embodiment, there may be formed on the fabric base layer a microporous layer of polyurethane material having a relatively low apparent density (e.g., a layer 0.5 mm thick having an apparent density of 0.4 g/cm$^3$).

The invention is most useful in making substitutes for shoe upper leather. In the manufacture of shoes, it is customary to cut the upper leather, usually with a die by machine, and to fit and assemble the parts of the upper together (including any doubler or lining that is to be used) as by stitching and/or cementing so as to ready the upper for lasting. After the insole has been secured to the bottom of the last, the upper is placed on the last, pulled over the wooden last so as to conform tightly to it, and attached to the insole. This "pulling over" is generally effected by mechanisms which grip, and pull, the upper at its edges, e.g., at the toe and sides.

During the fitting together of the upper, the edges of the upper leather are generally "skived", by cutting a bevel on the "flesh side" of the leather adjacent its edge and the skived edge is then cemented, folded back on itself and pressed in place, to give a neat finished top line or other edge.

Descriptions of the conventional methods for making shoes are contained in the 61 page publication "How American Shoes Are Made" 3rd edition, copyright 1966 by United Shoe Machinery Corporation.

The microporous sheets consisting essentially of microporous thermoplastic elastomeric polyurethane are particularly suitable for use as substitutes for upper leather in the manufacture of men's and women's shoes. The upper not only conforms unusually well to the last, without wrinkling or puckering, but also retains its lasted shape very well after removal from the last, particularly when the upper has been given the conventional type of heat setting treatment (e.g., setting with heat alone or moist heat) on the last. The material has very good skiving characteristics, particularly if it is wet with water prior to skiving. The shoes are comfortable and the uppers show very good wear resistance. Unlike many shoes made with the conventional fabric-reinforced leather substitutes, there is no problem of fabric showthrough or orange peel on lasting.

It is understood that the foregoing detailed description is given merely by way of illustration and that variations may be made therein without departing from the spirit of the invention.

We claim:

1. Process for treating a flexible water-vapor permeable sheet material having a microporous surface of elastomeric polyurethane, which comprises depositing on said surface a discontinuous or open pattern of elastomeric polyurethane in low relief, said pattern comprising small closely spaced raised polymer deposits bonded to said surface and so spaced and of such size that no point on said small raised deposits and in the spaces between said small raised deposits is further than about 2 mils from a boundary of a small raised deposit, said deposition being effected by applying a viscous polyurethane solution, containing a solvent for the polyurethane of said solution, to said surface in accordance with said pattern and solidifying the applied material by removal of the solvent, said solvent being a solvent for the polyurethane material of said microporous surface, said microporous surface remaining exposed in said spaces between said small raised deposits, the height of the deposit of viscous solution and its viscosity being such, in relation to said surface, that said solidified deposits have heights in the range of about 1/10 to 1 mil, said raised deposits of said pattern covering about 30 to 70 percent of the total projected area of said surface whereby to produce a sheet which has good abrasion resistance, is moisture vapor permeable and has good flex life.

2. Process as in claim 1 in which the polyurethane of said microporous surface is soluble in N,N-dimethylformamide and the deposition of said low relief pattern is effected by applying a viscous pigment-containing blend of N,N-dimethylformamide and dissolved thermoplastic elastomeric polyurethane to said surface by intaglio printing.

3. Process for treating a flexible water-vapor permeable sheet material having a microporous surface of elastomeric polyurethane, which comprises depositing on said surface a discontinuous or open pattern of plastic polymer in low relief, said pattern comprising small closely spaced raised polymer deposits bonded to said surface and so spaced and of such size that no point on said small raised deposits and in the spaces between said small raised deposits is further than about 2 mils from a boundary of a small raised deposit, and then depositing a higher relief visible pattern of spaced masses of plastic polymer over said closely spaced deposits pattern so that individual masses lie over a plurality of said closely spaced deposits and said overlying masses are bonded to said closely spaced deposits and to said surface with the spaces between said masses being filled by said pattern of small raised deposits in which pattern said microporous surface remains exposed between deposits, whereby to produce a moisture vapor permeable sheet having a clearly visible decorative pattern of said spaced masses and having good flex life, said sheet having better abrasion resistance than a similar sheet having said visible decorative pattern of said masses but free of said low relief pattern of closely spaced deposits, said polymer of said deposits and said masses being applied by applying, in said patterns, viscous solutions of polymer in solvent therefor, the solvent in each of said solutions being a solvent for the polyurethane material of said microporous surface 4. Process as in claim 3 in which said plastic polymer is an elastomeric polyurethane.

5. Process as in claim 3 in which said polymer of said deposits and said masses is applied by intaglio printing, in said respective patterns, of viscous solutions of plastic polymer in solvent therefor.

6. Process as in claim 5 in which said plastic polymer is an elastomeric polyurethane, each of said solutions contains dimethylformamide and the polyurethane of said microporous surface is soluble in dimethylformamide.

7. A flexible water-vapor permeable abrasion resistant sheet material having a microporous surface of elastomeric polyurethane carrying on its surface a discontinuous or open pattern of elastomeric polyurethane in low relief, said pattern comprising small closely spaced raised polymer deposits of elastomeric polyurethane about ¼ to 1 mil in height bonded to said surface and so spaced and of such size that no point on said small raised deposits and in the spaces between said small raised deposits is further than about 2 mils from a boundary of a small raised deposit, said microporous surface being exposed in said spaces between said small raised deposits, said raised deposits of said pattern covering about 30 to 70 percent of the total projected area of said pattern.

8. Sheet material as in claim 7 in which said deposits are bonded to said surface by the attack of a solvent on the surface underlying said deposits, said solvent being a solvent for the polyurethane material of said surface.

9. A flexible water-vapor permeable abrasion resistant sheet material having a microporous surface of elastomeric polyurethane material carrying on its surface, and bonded thereto, a visible decorative pattern of spaced masses of plastic polymer covering about 20 to 70 percent of the total projected area of the sheet, the microporous surface in the spaces between said masses being covered with a discontinuous or open pattern of plastic polymer in low relief, said pattern comprising small closely spaced raised polymer deposits about ¼ to 1 mil in height bonded to said surface and so spaced and of such size that no point on said small raised deposits and in the spaces between said small raised deposits is further than about 2 mils from a boundary of a small raised deposit, said microporous surface being exposed in said spaces between said small raised deposits, said raised deposits of said low relief pattern covering about 30 to 60 percent of the total projected area of the spaces between said masses, the heights of said masses being at least 50 percent greater than the heights of said small raised deposits, and the areas of said masses being such that if an individual mass is laid down on top of said low relief pattern it will cover a plurality of said deposits and the spaces between said plurality of deposits, said sheet having better abrasion resistance than a similar sheet having said visible decorative pattern of said masses but free of said low relief pattern of closely spaced deposits.

10. Product as in claim 9 in which said masses and deposits are of elastomeric polyurethane and the heights of said masses are up to 6 times the heights of said deposits.

* * * * *